Patented Oct. 19, 1948

2,451,738

UNITED STATES PATENT OFFICE 2,451,738

PROCESS FOR THE MANUFACTURE OF PENTAENES

Otto Isler, Basel, Switzerland, assignor to Hoffmann-La Roche Inc., Nutley, N. J., a corporation of New Jersey No Drawing. Application February 10, 1947, Serial No. 727,734. In Switzerland October 18, 1945

9 Claims. (Cl. 260—611)

This invention relates to the manufacture of pentaenes. The constitution of vitamin A has been known since 1933 (Karrer, "Helvetica Chimica Acta," vol. 16, year 1933, page 557). Many experiments have since been undertaken with a view to obtaining substances possessing vitamin A activity. In 1942 it was, for instance, suggested to prepare compounds possessing the constitution of vitamin A from the aldehyde $C_{14}H_{22}O$ [4-(2',6',6'-trimethyl-cyclohexane-(1')-yl)-2-methyl-butene-(2)-al-(1)]in the following manner (Heilbron, "Journal of the Chemical Society of London," year 1942, page 727): Addition of acetylene and methylomega-alkoxy-ethyl-ketone or the condensation product thereof, respectively, aniono-tropic rearrangement, partial hydrogenation of the triple bond and splitting off of water at any stage of the synthesis. However, so far no substantial success in this respect has been reported. Similar processes for the manufacture of vitamin A ethers are claimed by N. Milas in U. S. patent specifications 2,369,157 and 2,382,086. However, a wrong structural formula is ascribed to the aldehyde $C_{14}H_{22}O$, and, consequently, it is not recognized that prior to splitting off water or acid, respectively, the condensation products must be subjected to an allyl rearrangement. The splitting off of water is striven for either by warming with p-toluene-sulphonic acid in toluene or by halogenating by means of phosphorous halogenide and splitting off of acid with alcoholic alkali. According to both these methods the allyl-rearrangement step—not recognized by the said author—however, takes place only to a low degree and, consequently, only modest quantities of active vitamin A are obtained.

It has now been found, according to the present invention, that vitamin A-active compounds can be obtained by condensing 4-(2',6',6'-trimethyl-cyclohexene-(1')-yl)-2-methyl-butene-(2)-al-(1) by a Grignard reaction with an ester of 1-hydroxy-3-methyl-pentene-(2)-yne-(4) and, in optional sequence, partially hydrogenating, by the action of 1 mol hydrogen, at the triple bond and warming, preferably in the presence of an inert solvent, with a strong carboxylic acid the ether of 1-hydroxy-3,7-dimethyl-6-hydroxy-9-trimethyl-cyclohexenyl-nonadiene-(2,7)-yne-(4) thus obtained. The synthesis may be illustrated by the following formulae

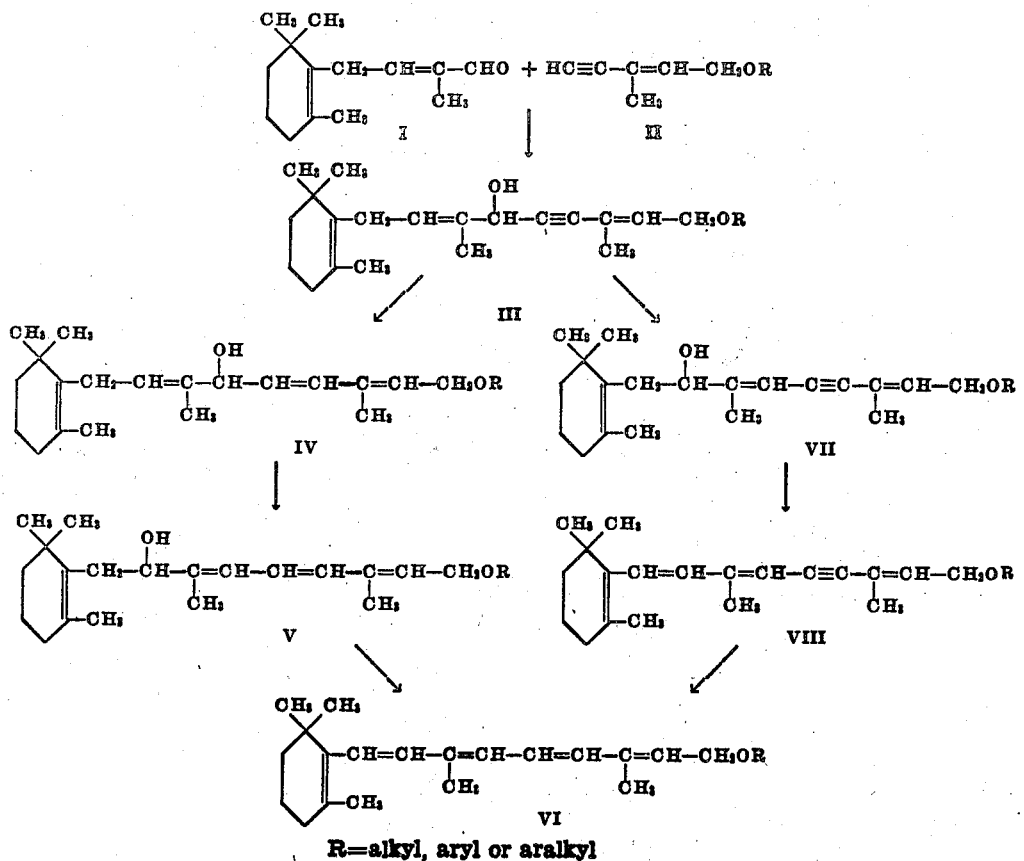

R=alkyl, aryl or aralkyl

The synthesis of the vitamin A ethers, which all contain the system of five double bonds conjugated to one another, may thus be effected by uniting the two parts I and II to a condensation product III, carrying three double bonds and one triple bond, only two of which are conjugated to one another. From this condensation product the pentaene chain is formed by partial hydrogenation of the triple bond and by rearrangement of a double bond under separation of water.

The starting materials required, viz.: 4-trimethyl - cyclohexenyl-2-methyl-butenal and the ethers of 1-hydroxy-3-methyl-pentene-(2)-yne-(4) may be prepared as follows:

4-trimethyl-cyclohexenyl-2-methyl - butene-(2)-al-(1) is obtained from β-ionone by glycide ester synthesis, saponification of the glycide ester formed, and decarboxylation of the glycide acid. The said aldehyde $C_{14}H_{22}O$ may be purified by way of the phenylsemicarbazone thereof having its melting point at 182° C. and may be regenerated therefrom just before use by heating with phthalic acid anhydride.

1 - alkoxy-3-methyl - pentene-(2)-yne-(4) is obtained by reacting 3-hydroxy-3-methyl-pentene-(1)yne-(4) (the condensation product of methylvinylketone and acetylene) with acid and alcohol; the hydroxyl group is simultaneously etherified and shifted thereby. 1-methoxy-3-methyl-pentene-(2)-yne-(4) is, for instance, formed in good yield by stirring 3-hydroxy-3-methyl-pentene(1)-yne-(4) with 30 per cent methyl-alcoholic sulphuric acid during 4 hours. The substance boils at 73–75° C. under a pressure of 100 mm. Hg; $n_D^{23°}=1.455$.

1 - alkoxy-3-methyl - pentene-(2) - yne-(4) may also be prepared by halogenating 3-hydroxy-3-methyl-pentene(1)-yne-(4) with phosphorous halides, and reacting the primary halide thus formed with sodium alcoholate. The phenyl and the benzyl ether may be prepared correspondingly. Furthermore, the phenyl ether may be obtained in good yield from the primary bromide by boiling with phenol in acetone in the presence of potassium carbonate.

The first step of the present process is a Grignard reaction by which ethers of 1-hydroxy-3-methyl-pentene-(2)-yne-(4) are first reacted with 1 mol of alkyl magnesium halide (for instance, ethyl magnesium bromide). The magnesium compound formed is condensed with 4-trimethyl-cyclohexenyl-2-methyl-butene-(2)-al-(1) in the manner known per se. The reaction takes place in one of the usual solvents, such as ethyl ether. The reaction product is hydrolysed in the customary manner, for instance, with an ammonium salt solution. Any parts of the aldehyde not having entered into reaction may be separated off in form of a crystallizing derivative, for instance, as phenylsemicarbazone. However, the condensation products of Formula III may more suitably be purified by distillation. They are viscous, yellowish oils, not absorbing ultra violet rays of higher wave length than 260 mμ; the solution in arsenic trichloride is of violet colour. By Zerewitinoff analysis, the compounds prove to possess one active hydrogen atom.

The condensation product III, suitably after purification, is then partially hydrogenated at the triple bond. (The methods for executing the new process according to which the sequence of reaction steps is inverted will be explained separately below.) Palladium calcium carbonate and palladium barium sulphate may, for instance, be used as catalysts; for the selective hydrogenation of the triple bond, palladium charcoal, onto which quinoline has been adsorbed, is preferred. The introduction of hydrogen is stopped as soon as the calculated quantity of hydrogen has been taken up. It is not necessary to isolate and to purify the hydrogenation products. They are viscous, yellowish oils, not adsorbing any ultraviolet rays of higher wave length than 260 mμ; their solution in arsenic trichloride or trichloro-acid-chloroform is of blue colour.

The condensation products IV formed by partial hydrogenation are treated with a means effecting a so-called allyl rearrangement, whereby a migration of the hydroxyl group from position 6 into position 8, in given cases with simultaneous substitution, and of the adjacent double bond into position 6 takes place. Water is then split off in order to effect introduction of a new double bond into compound V thus obtained. According to the present invention allyl rearrangement and dehydration may be effected in one single reaction step, if the condensation product is heated, preferably in an inert solvent, with a strong carboxylic acid; the course of this reaction is very surprising. Organic carboxylic acids which are suitable for effecting the new reaction are characterized by having a dissociation constant higher than the one of acetic acid. Thus certain aliphatic carboxylic acids, such as formic acid or trichloracetic acid and a series of aliphatic and aromatic dicarboxylic acids and hydroxy carbonylic acid as, for instance, oxalic acid, malonic acid, phthalic acid, glycolic acid and salicylic acid may be used. Solvents with a boiling point between 80–140°, such as benzene, toluene, dioxan and petroleum ether of boiling point 80–120° have proved to be especially useful. If stronger acids are used the rearrangement and dehydration will take place at lower temperatures than with weaker acids. Thus oxalic acid will already be effective in boiling ethyl ether. Warming with oxalic acid in dioxan, boiling with aqueous formic acid and heating with phthalic acid or glycolic acid in toluene are effective combinations. The compound obtained will correspond to Formula VI, the terminal functional group being an etherified hydroxyl group.

Pentaenes (vitamin A ether) may also be obtained by the following modification of process with inverted sequence of reaction steps: The condensation product III (ether of 1-hydroxy-3,7-dimethyl - 6-hydroxy-9-trimethyl - cyclohexenyl-nonadiene-(2,7)-yne-(4) is heated, preferably in an inert solvent, with a strong carboxylic acid and the compound is partially hydrogenated at the triple bond by the action of 1 mol of hydrogen. This modification during which allyl rearrangement and dehydration are effected before the partial hydrogenation of the triple bond follows Formulas I, II, III, VII, VIII and VI of the scheme set out in columns 1 and 2. The means for carrying out the individual steps of this modification are substantially the same as above described.

In accordance with the present invention, the manufacture of vitamin A methyl ether may, for instance, be carried out as follows. 4-(2',6',6'-trimethyl - cyclohexene - (1') - yl) - 2 - methyl-butene-(2)-al-(1) is condensed with 1-methoxy-3-methyl-pentene-(2)-yne-(4) with the aid of 1 mol of ethyl magnesium bromide. 1 mol of hydrogen is added to the triple bond of the resulting 1-methoxy-3,7-dimethyl-6-hydroxy-9- trimethyl-cyclohexenyl - nonadiene-(2,7) - yne-(4), palladium on charcoal, onto which quinoline has been adsorbed before use, being employed as catalyst. The resulting 1-methoxy-3,7-dimethyl-6-hydroxy-9-trimethyl-cyclohexenyl-nonatriene-(2,4,7) is heated with oxalic acid in an inert organic solvent. A modification of this process consists in boiling 1-methoxy-3,7-dimethyl-6-hydroxy-9-trimethyl-cyclohexenyl-nonatriene-(2,4,7), obtained by partial hydrogenation, with glycolic acid in an inert organic solvent.

According to the present process as above set forth, vitamin A ethers are obtained which possess the same biological activity as vitamin A and its derivatives obtained from natural sources. The products of the process are characterized by showing a maximum of absorption in ultraviolet spectrum at 328 m$\mu$ and by the colour reactions with antimony trichloride (the chloroform solution showing in accordance with Carr-Price, light absorption maxima at 620 and 580 m$\mu$), arsenic trichloride, aluminum silicate and trichloroacetic acid as specific to vitamin A.

The products of the process may be purified by the same methods as high concentrates of vitamin A and its derivatives from natural sources (separation between solvents, chromatographic adsorption, careful distillation, etc.). Like natural vitamin A, the products must be protected from the deteriorating effects of light, air and heat. It is advisable to add antioxidants; they may also be present during the different steps of the synthesis. Tocopherols are particularly suitable as antioxidants.

*Example 1*

13.5 parts by weight of 1-methoxy-3-methyl-pentene-(2)-yne-(4) in 30 parts by volume of ether are added during 1 hour while stirring in a nitrogen atmosphere to a solution of ethylmagnesiumbromide, previously prepared from 3 parts by weight of magnesium and 14 parts by weight of ethyl-bromide in the presence of 30 parts by volume of ether. During the addition, the reaction solution must be kept slightly boiling. Thereafter, the mixture is refluxed for 4 hours. The resulting magnesiumbromide compound of the methyl-pentenyne is partly deposited as a gray smear. The mixture is left to cool and then a solution of 18 parts by weight of 4-(2',6',6'-trimethyl-cyclohexene-(1')-yl)-2-methyl-butene-(2)-al-(1) in 60 parts by volume of ether is added in the course of 1 hour. The temperature of the reaction mixture rises thereby and the deposit is dissolved. The solution is stirred overnight and then refluxed for 2 hours. Subsequently, it is diluted with ether, whereafter a 20 per cent. ammonium-nitrate solution is added while cooling. After washing with water and drying, the ether is boiled off. Parts of the aldehyde which have not taken part in the reaction are precipitated as phenylsemicarbazone by a methyl-alcoholic solution of phenylsemicarbazide. The desired condensation product is isolated from the methyl-alcoholic solution and fractionated in a short-way distillation apparatus. Pure 1-methoxy-3,7-dimethyl-6-hydroxy-9-cyclohexenyl-nonadiene-(2,7)-yne-(4) distils over at 145° C. and at a pressure of $10^{-4}$ mm. Hg. The yield, calculated for the aldehyde, amounts to 80–90 per cent.

10 parts by weight of 1-methoxy-3,7-dimethyl-6-hydroxy-9-trimethyl-cyclohexenyl-nonadiene-(2,7)-yne-(4) are dissolved in 100 parts by volume of methyl alcohol, digested with 0.5 part by weight of animal charcoal, and filtered, whereupon the coal is washed with 30 parts by volume of methyl alcohol. 1 part by weight of 4 per cent. palladium charcoal, onto which 0.1 part by weight of quinoline has previously been adsorbed, is added to the filtrate. The mixture is allowed to take up 1 mol, i. e., 700 parts by volume, of hydrogen in a hydrogenation apparatus at room temperature without extra pressure. Towards the end of the reaction, the hydrogen absorption gradually slows down. The catalyst is filtered off, washed with little methyl alcohol, whereupon 300 parts of water are added to the filtrate. The hydrogenation product separates and is taken up in petroleum ether, washed with water and concentrated.

The 1-methoxy-3,7-dimethyl-6-hydroxy-9-trimethyl-cyclohexenyl-nonatriene-(2,4,7) (about 10 parts by weight) thus obtained is refluxed for 1 hour in 100 parts by volume of 50 per cent. formic acid in an inert atmosphere. The mixture is then left to cool down, taken up in petroleum ether of boiling point 30–70°, washed successively with 95 per cent. methyl alcohol and water, dried and evaporated to dryness. The residue is fractionated in a molecular still and then chromatographed by means of petroleum ether onto a column of weakly activated aluminum oxide. From the main zone of the chromatogram, characterized by its greenish fluorescence in the light of a quartz lamp, a concentrate of vitamin A methyl ether is obtained by elution with alcohol. This concentrate can be destilled under a pressure of $10^{-5}$ mm. Hg. at 90–95° and proves to be of high biological activity.

*Example 2*

4.5 parts by weight of 1-methoxy-3-methyl-pentene-(2)-yne-(4) in 10 parts by volume of ether are added in the course of one half hour, while stirring in a nitrogen atmosphere, to a solution of ethylmagnesiumbromide, previously prepared from 1 part by weight of magnesium-chips and 4.6 parts by weight of ethyl-bromide in 20 parts by volume of ether. Thereupon, the mixture is refluxed for 2 hours, left to cool down, and a solution of 6 parts by weight of 4-trimethyl-cyclohexenyl-2-methyl-butene-(2)-al-(1) in 12 parts by volume of ether is added in the course of one half hour. The mixture is stirred for 2 hours at room temperature, whereupon it is refluxed for 2 hours. It is then left to cool down and the clear reaction solution is poured into a mixture of 10 parts by weight of ammonium chloride and 50 parts by weight of ice. The hydrolised condensation product is taken up in ether, washed with water and dried with sodium sulphate, the solvent is evaporated and the residue fractionated. 8 parts by weight of 1-methoxy-3,7-dimethyl-6-hydroxy-9-trimethyl-cyclohexenyl-nonadiene-(2,7)-yne-(4) of boiling point 161–163° C. under a pressure of 0.05 mm. Hg. are obtained.

10 parts by weight of this condensation product are dissolved in 100 parts by volume of methyl alcohol by means of 0.5 part by weight of 2 per cent. palladium charcoal, onto which 0.25 part by weight of quinoline have previously been adsorbed. It is suitable to add 0.05 part by weight of tocopherol as antioxidant already before hydrogenation. After 1 mol of hydrogen has been taken up the hydrogenation is interrupted, the catalyst sucked off, the filtrate concentrated and the residue fractionated. 9.6 parts by weight of 1-methoxy-3,7-dimethyl-6-hydroxy-9-trimethyl-cyclohexenyl-nonatriene-(2,4,7) of boiling point 151–153° C. under a pressure of 0.05 mm. Hg are obtained.

10 parts by weight of this compound are dissolved in 100 parts by volume of toluene, 5 parts by weight of glycolic acid are added and the mixture is refluxed for 1 hour. After cooling down the product is taken up in petroleum ether of boiling point 30–60°, washed successively with 95 per cent. methyl alcohol and water and dried whereupon the solvent is evaporated. 7 parts by weight of an oil containing 30 per cent. vitamin A methyl ether are obtained.

Purification of the vitamin A methyl ether may, for example, be effected by means of a percolation chromatogram, using columns of slightly activated aluminum oxide and petroleum ether of boiling point 60–80° C. Intermediates with a free hydroxy group are adsorbed by the aluminum oxide whereas by-products, which are characterized by the ability to absorb light of lower wave lengths (280–290mµ), are less well adsorbed and thus concentrate in the first runnings. Vitamin A methyl ether slowly migrates along the column during which process its position may be located by its intensive yellow green fluorescence in ultraviolet light. The good fraction is characterized by showing a stable Carr-Price colour reaction. After driving off the petroleum ether the vitamin A methyl ether obtained may be distilled in a molecular still. It is a yellow oil of boiling point 90–95° under a pressure of $10^{-5}$ Hg having a characteristic absorption maximum at 328 mµ and possessing high biological activity.

*Example 3*

10 parts by weight of 1-methoxy-3,7-dimethyl-6-hydroxy-9-trimethyl-cyclohexenyl-nonatriene-(2,4,7) (prepared according to Example 1 or 2) in 100 parts by volume of toluene are refluxed during 1 hour in an inert atmosphere with 2 parts by weight of phthalic acid. After cooling down, the mixture is diluted with petroleum ether, washed with a solution of sodium bicarbonate and then with water and dried with sodium sulfate whereupon the solvent is evaporated. The characteristics of the products so obtained are identical with those of the compound obtained according to Examples 1 and 2. The product may be purified as indicated in the said examples.

*Example 4*

10 parts by weight of 1-methoxy-3,1-dimethyl-6-hydroxy-9-trimethyl-cyclohexenyl-nonadiene-(2,7)-yne-(4) (prepared according to Example 2) are dissolved in 100 parts by volume of dioxan, 10 parts by weight of anhydrous oxalic acid are added and the mixture is warmed to 40° C. for 70 hours. After cooling down the product is taken up in petroleum ether of boiling point 30–60° C. washed with 95 per cent. methyl alcohol and then with water and dried whereupon the solvent is evaporated.

The dehydration product thus obtained (about 8 parts by weight) is hydrogenated in methyl alcoholic solution while using as a catalyst 0.6 part by weight of 4 per cent. palladium charcoal onto which 0.2 part by weight of quinoline have been adsorbed before use. After a little less than 1 mol of hydrogen has been absorbed the hydrogenation is discontinued, the catalyst is filtered off and the filtrate is concentrated to dryness. The residue is identical with the product of Example 1, vitamin A methyl ether may be isolated therefrom by chromatographic adsorption.

This application is a continuation-in-part of my co-pending applications Serial Nos. 703,483 and 703,484, filed October 16, 1946.

I claim:
1. A process of treating a member selected from the group consisting of alkyl, aryl, and aralkyl 1-ethers of 1-hydroxy- 3,7 -dimethyl-6-hydroxy-9-trimethyl - cyclohexenyl - nonadiene - (2,7)-yne-(4) which comprises a partial hydrogenation to convert the triple bond to a double bond and an allyl rearrangement effected by means of a carboxylic acid selected from the group consisting of formic acid, glycolic acid, phthalic acid, trichloracetic acid, malonic acid, oxalic acid and salicylic acid, these two steps being employed successively.
2. A process according to claim 1 in which the acid is formic acid.
3. A process according to claim 1 in which the acid is glycolic acid.
4. A process according to claim 1 in which the acid is phthalic acid.
5. A process according to claim 1 in which the hydrogenation precedes the rearrangement.
6. A process according to claim 1 in which the rearrangement precedes the hydrogenation.
7. A process according to claim 1 in which the ether is 1-methoxy.
8. A process according to claim 1 in which the rearrangement is carried out in an inert solvent.
9. A process according to claim 1 in which the rearrangement is carried out in the presence of toluene as a solvent.

OTTO ISLER.

REFERENCES CITED

The following references are of record in the file of this patent:

UNITED STATES PATENTS

| Number | Name | Date |
|---|---|---|
| 2,412,465 | Milas | Dec. 10, 1946 |

FOREIGN PATENTS

| Number | Country | Date |
|---|---|---|
| 560,081 | Great Britain | Mar. 20, 1944 |

OTHER REFERENCES

Heilbron et al.: "Jour. Chem. Soc." (London) (1942), pages 727–737. Milas: "Science," vol. 103 (1946), pages 581–583.

Certificate of Correction

Patent No. 2,451,738.

October 19, 1948.

OTTO ISLER

It is hereby certified that errors appear in the printed specification of the above numbered patent requiring correction as follows:

Column 1, line 10, for "cyclohexane" read *cyclohexene*; column 2, line 16, for "ester" read *ether*; column 3, line 26, for "-(1)yne" read *-(1)-yne*; lines 32 and 38, for "pentene(1)" read *pentene-(1)*; column 4, line 8, for "adsorbing" read *absorbing*; line 9, for "260 mu" read *260 mµ*; lines 32 and 33, for "carbonylic" read *carboxylic*; line 54, after "(4)" insert a closing parenthesis; line 56, after the word "compound" insert *formed*; column 7, line 50, for "3,1-" read *3,7-*;

and that the said Letters Patent should be read with these corrections therein that the same may conform to the record of the case in the Patent Office.

Signed and sealed this 8th day of February, A. D. 1949.

[SEAL]

THOMAS F. MURPHY,
*Assistant Commissioner of Patents.*